July 13, 1937.  A. ROSENTHAL ET AL  2,086,960
HUSKER-SHREDDER
Filed July 19, 1934
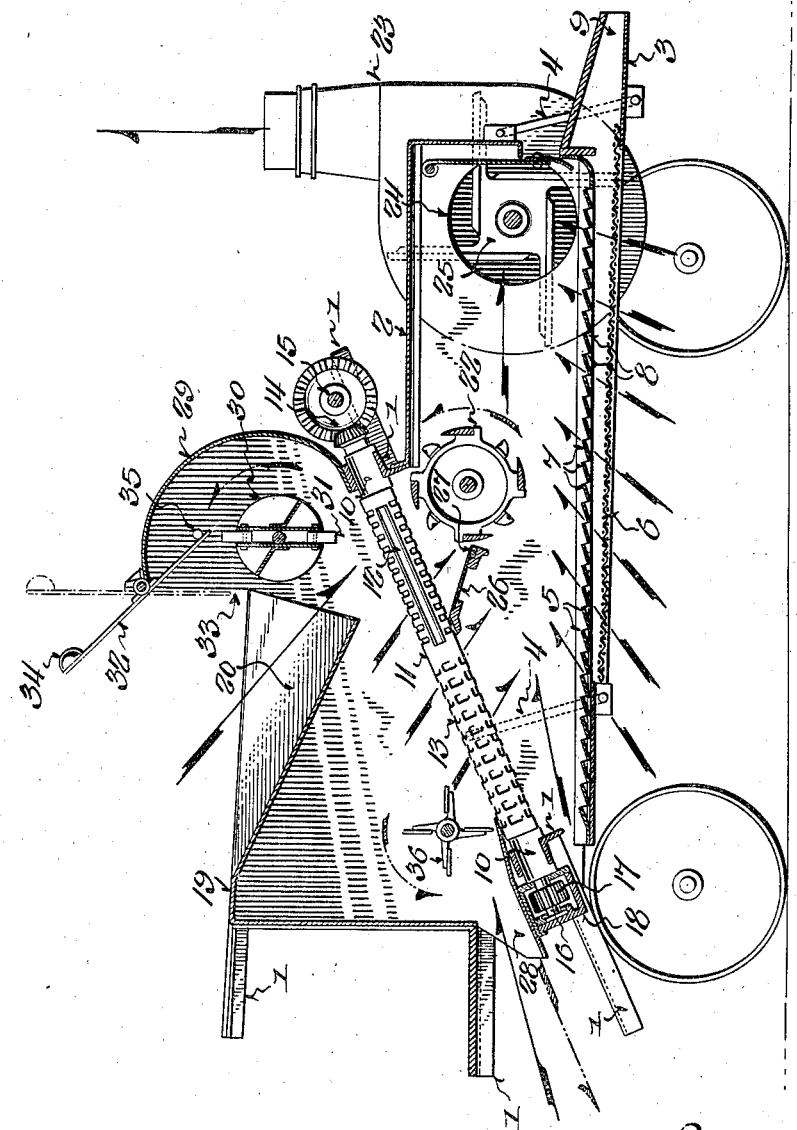
Inventors
Henry L. Rosenthal
August Rosenthal
By
Attorneys Patented July 13, 1937

2,086,960

UNITED STATES PATENT OFFICE 2,086,960

HUSKER-SHREDDER

August Rosenthal and Henry L. Rosenthal, Wauwatosa, Wis., assignors to Rosenthal Mfg. Co., West Allis, Wis., a corporation of Wisconsin Application July 19, 1934, Serial No. 735,974

1 Claim. (Cl. 130—33)

This invention pertains to corn huskers and shredders of the well-known "Rosenthal" type, and has primarily for its object to improve such machines to the extent of controlling forced circulation of air through the machine to cause all of the material handled to pass through the forced circulation, thus insuring thorough cleaning of the material, and at the same time eliminating the accumulation of dirt and loose particles within the machine.

Incidental to the foregoing, a more specific object of the invention resides in maximum restriction of the feed opening by the provision of means for guiding material into the machine, and to prevent clogging of material at the restricted feed mouth.

A further object resides in accomplishing the foregoing by means of a beater positioned in the feed mouth above the husking rolls in combination with a pivotal flap or gate, which normally forms a restriction of the feed mouth, and at the same time a guide for directing material into the machine, the flap being free to swing outwardly and permit the machine to clear itself of the material, should the same become entangled in the beater above the rolls.

With the above and other objects in view, which will appear as the description proceeds, the invention resides in the novel construction, combination, and arrangement of parts, substantially as hereinafter described and more particularly defined by the appended claims, it being understood that such changes in the precise embodiment of the herein disclosed invention may be made as come within the scope of the claims.

In the accompanying drawing is illustrated one complete example of the physical embodiment of the present invention constructed according to the best mode so far devised for the practical application of the principles thereof.

In the drawing:—

The figure is a vertical, longitudinal, sectional view through a husker shredder, illustrating one form of structure for carrying out the principles of the present invention.

Referring now more particularly to the accompanying drawing, the machine illustrated comprises a conventional framework fabricated from the usual longitudinal and transverse braces 1, only portions of which are shown. Carried by the frame is an elongated housing 2, the various working parts of the machine being enclosed therein. The housing 2 is open at its bottom for reception of a conventional shaker trough 3, supported for reciprocative movement on the parallel links 4. The trough 3 comprises a main feeding screen 5, and an auxiliary separating screen 6 adapted to collect separated kernels of corn and sift out particles of dirt and foreign material. The feeding screen 5 is preferably formed of sheet metal and provided with struck-up prongs 7, which form the apertures 8, whereby upon rapid reciprocative movement of the shaker, the material is fed toward the rear end, while dirt and loose kernels of corn pass through the apertures 8, and are then separated by the screen 6, the separated kernels being discharged from the mouth 9 at the rear end of the shaker.

Journaled within the bearings 10, carried by the transverse angle braces 1, are the usual inclined snapping and husking rolls 11, the upper portions of which are provided with longitudinal ribs 12 for snapping the ears from the stalks as they are fed through the rolls, while the lower ends of the rolls are provided with the usual husking surfaces 13.

Drive for the rolls 11 is obtained by a set of beveled gears 14 connecting the upper end of one of the rolls with a transverse driven shaft 15 journaled in suitable bearings mounted upon the inclined longitudinal braces, which carry the transverse angle supports for the bearings 10. The lower ends of the rolls 11 are provided with extending trunnions 16 having meshing spur gears 17, which impart simultaneous rotation to the rolls for effecting the snapping and husking operations in the well-known conventional manner. The gears 17 are housed within a closed casing 18, which enables them to be properly lubricated, and at the same time protects them from grit and dirt carried on the material.

The upper forward end of the housing 2 provides a feed table 19 having a downwardly inclined trough portion 20 into which the stalks are manually fed to the rolls 11, and after passing through the rolls, during which operation snapping of the ears is effected, the stalks are engaged by a rotary cutter and shredder 22, which serves the stalks into small particles, subsequently discharged from the housing by a blower 23 secured to one side of the housing adjacent the rear end, and provided with an opening 24 communicating with the interior of the housing. A conventional fan or impeller 25 creates a forced circulation of air through the housing 2, and discharges material therefrom.

The inclined apron 26, positioned below the snapping portion of the husking rolls, guides the stalks passing through the rolls to a shear bar 27, which cooperates with the cuter 22 to effect severing of the stalks.

After the severed ears travel down the inclined rolls 11, the husking operation takes place on the mutilated surfaces 13 of the rolls, and the husked ears are then discharged through a spout 28 formed in the housing 2 adjacent the lower ends of the rolls. In order to insure complete husking operation, a rotary paddle 36 is mounted within the housing adjacent the lower ends of the rolls, which functions to retard travel of the ears on the lower portions of the husking rolls, the paddle being rotated in a direction opposite to the travel of the ears.

To facilitate feeding of the stalks to the rolls 11, the housing 2, adjacent the upper ends of the rolls, is provided with a hood 29, in which a rotary beater 30 is mounted above the upper ends of the rolls and adjacent the discharge end of the trough 20. Obviously, as the stalks are manually fed into the trough 20, the lugs 31, and beater blades will engage the same and turn their ends downwardly to be engaged by the rolls 11 at approximately right angles to the stalks, which insures the most efficient snapping operation, and at the same time delivers the stalks to the cutter, in such position as to be most easily cut.

The machine thus far described is more or less conventional, and therefore forms no specific part of the present invention, other than in the combination as hereinafter claimed, the salient features of the invention residing in restricting and controlling the forced circulation of air so as to cause all of the material to pass through the same, and at the same time reducing the power required to effect the necessary circulation.

The foregoing is accomplished by a flap or gate 32, pivotally connected to the upper forward end of the hood 29, which is open to provide a feeding mouth 33 in conjunction with the discharge end of the feed trough 20.

The flap 32 is provided with a counter-weight 34, which normally holds the flap in an inclined position against the stop 35, as illustrated in the drawing, with the lower end of the flap terminating closely adjacent the beater 30, the plates of which cooperate with the flap 32 to normally restrict the feed mouth 33, thus causing the air to be drawn into the machine through the feeding mouth, as indicated by the full line arrow. Obviously, the flap 32, being inclined downwardly and inwardly, will normally function as a guide to direct loose material toward the beater, thus preventing accumulation of the same in the hood above the beater.

In the event that the material, because of its condition, should have a tendency to accumulate and clog above the rolls 11, or become entangled in the beater 30, the same may be carried around by the beater to engage the lower end of the flap 32 and force the same outwardly, as shown in dotted lines, permitting the entangled material to be again carried downwardly toward the rolls 11, with the result that the machine will quickly free itself, and at the same time the feed mouth is continuously restricted to the extent that the velocity of the forced draft is not affected.

From the forgoing explanation, considered in connection with the accompanying drawing, it will be readily seen that an extremely efficient structure has been provided, in which the openings into the casing are restricted to a maximum degree, thus effecting a more accurate and definite control of the circulation of air through the housing, which reduces the power required for creating the circulation, and at the same time causes the circulated air to pass through all of the material as it passes through the machine, with the result that complete and thorough cleaning of the material is effected, and accumulation of dirt and refuse is entirely eliminated.

In respect to the foregoing, it is highly important to the invention that provision be made to permit clearing of accumulated material at the restricted feed mouth of the machine, and to this end the pivotal flap 32, functioning in cooperation with the beater 30, is essential, in that it not only serves to restrict the feed mouth, but also guides loose material into the machine.

We claim:—

In a corn husking machine including, a housing having an open bottom and provided with a feed mouth and discharge opening adjacent its forward end, inclined husking rolls positioned within said housing below the feed mouth and discharge opening, a perforate shaker trough positioned within the open bottom of said housing and extending substantially its entire length, and a blower communicating with the rear end of said housing for drawing air through the feed mouth, the discharge opening and shaker trough; a rotatable beater journaled transversely of said housing above the bottom of said feed mouth and adjacent thereto, said beater rotating in a direction to feed material from said feed mouth to the husking rolls, and a yieldable transverse flap pivotally mounted in said casing above the beater with its lower edge normally positioned closely adjacent the top of the beater and adapted to swing toward said mouth and away from the beater.

AUGUST ROSENTHAL.
HENRY L. ROSENTHAL.